US005972467A

United States Patent [19]
Washo

[11] Patent Number: 5,972,467
[45] Date of Patent: Oct. 26, 1999

[54] PRESSURE FORMING PROCESS FOR PRESSURE-FORMED BAMBOO PRODUCTS

[76] Inventor: Kenji Washo, 30-5, Tsunoecho 1-chome, Takatsuki-shi, Osaka, Japan

[21] Appl. No.: 09/121,047

[22] Filed: Jul. 23, 1998

[51] Int. Cl.[6] .............................. B23B 5/28; B23B 5/12; B27M 1/02

[52] U.S. Cl. ........................ 428/107; 52/730.1; 52/740.1; 144/333; 144/346; 144/364; 144/380; 144/362; 428/57; 428/106; 428/113; 428/537.1

[58] Field of Search .............................. 52/730.1, 730.3, 52/730.4, 740.1, 309.1, 309.7; 428/57, 106, 114, 370, 107, 105, 113, 194, 537.1, 535; 144/333, 344, 346, 348, 352, 359, 363, 364, 355, 380, 362, 361

[56] References Cited

U.S. PATENT DOCUMENTS 4,672,006 6/1987 McGraw ................................ 144/362
5,067,536 11/1991 Liska et al. ............................ 144/361
5,161,591 11/1992 Sealey et al. .......................... 144/362
5,334,445 8/1994 Ruyter et al. .......................... 144/361
5,441,787 8/1995 Fujji et al. .......................... 428/106 X
5,505,238 4/1996 Fujii et al. ............................ 144/362
5,543,197 8/1996 Plaehn .................................... 428/106

*Primary Examiner*—W. Donald Bray

[57] ABSTRACT

The present invention relates to a pressure-formed bamboo sheets or bars composed of bamboo materials having a reduced variation in fiber density. A bamboo is split in the peripheral direction into a plurality of long bamboo slices, then the long bamboo slices are subjected to heat mothproofing. The heat-mothproofed bamboo slices are separated under pressure into a plurality of extra-fine bamboo slivers and are coated with resin until one complete bamboo sheet or bar is obtained.

15 Claims, 9 Drawing Sheets

PRESSURE FORMING PROCESS FOR PRESSURE-FORMED BAMBOO PRODUCTS

BACKGROUND OF THE INVENTION

The present invention relates to a pressure-formed bamboo sheet or bar and a production process therefor.

For the purpose of prior art for production of a sheet from bamboo, for example, as shown in FIGS. 9(A)–9(F), a bamboo plate material is produced by cutting a bamboo 1 of a given size along the axial direction of the bamboo into a plurality of slices to form a plurality of long bamboo square bars 4, joining said bamboo square bars 4 together into a laminated bamboo sheeting 5, and cutting said bamboo laminated sheeting 5 in a proper thickness.

More specifically, bamboo 1 is cut in a proper length, as shown by FIG. 9(A). Next, the bamboo 1 is split in the radial direction into proper numbers of slices, as shown in FIGS. 9(B) and (C). Then, each of the slices is machined by cutting off the inner and outer faces thereof to form a long bamboo square bar 4 having a length a and a width b, as shown in FIGS. 9(D) and (E). Then, a plurality of the long bamboo square bars 4 are laminated to each other into a laminated bamboo sheeting 5, as shown in FIG. 9(F). Specifically, the long bamboo square bars 4 are joined together under pressure with their respective front and back faces 41 and 42 stuck to each other with adhesives. In the drawing, the numeral 43 designates the side of the long bamboo square bars 4, and 44 the end face of same, the bamboo fibers extending in a longitudinal direction (in the direction x). Finally, the laminated bamboo sheeting 5 is cut from above piece by piece in an equal thickness to obtain a bamboo plate material 6, as shown by a dotted line in FIG. 9(F). The resultant bamboo plate material 6 comprises slices 6' constituted by long bamboo square bars 4 connected with each other in the direction of width (in the direction y), with the bamboo fibers extending longitudinally (in the direction x), and the bamboo density changing widthwise (in the direction y). To be specific, the density is thicker at the side of front face 41, and more coarse at the side of back face 42.

With the bamboo plate materials, however, only a few parts of bamboo 1 can be used, while the other parts are thrown away. In addition, the processing of bamboo is complicated, and there is a limit to the promotion in the efficiency of production. Specifically, as shown in FIGS. 9(D) and (E), a machining operation takes place in the form of cutting off the inner and outer peripheries from a bamboo slice to form a long bamboo square bar 4 having a length a and a width b. The remaining bamboo parts left behind after forming the long bamboo square 4 are destined to be abandoned. And the processing involved in each procedure step is complex, such that the predetermined dimensions a, b must be secured at the step where a long bamboo square bar 4 is obtained. In addition, as shown in FIG. 9(F), the long bamboo square bars 4 must be laminated to one to another. In particular, irregularities in the dimensions a, b of each long bamboo square bar 4 is liable to give rise to gaps between the adjacent long bamboo square bars 4. Therefore, a resultant bamboo plate material 6 may also have such gaps formed therewithin so as to be imperfect as a plate-formed product. Furthermore, requiring a long bamboo square bar 4 with a predetermined length and width a and b from a hollow cylindrical bamboo makes it difficult to find and cut off a usable bamboo portion, and much of the long bamboo square bar 4 unavoidably goes to waste, as described above. Additionally, the fibers of resultant bamboo plate materials 6 may be irregular in density. While on the one hand, development of new uses for such products may be possible, these products will have restrictions in use.

Occasionally, some bamboo has eggs laid therein by insects harmful to bamboo. Although harmful insects can be exterminated from the bamboo using chemicals and drugs, laid eggs cannot possibly be exterminated completely. Thus after such egg-infested bamboo in question is processed into final products or after such products are sold, the eggs within the bamboo hatch, and the resulting insects eat away the bamboo from within to such an extent that the bamboo finally becomes porous.

An object of a first invention of the present application is to develop a pressure-formed bamboo product composed of bamboo materials which have reduced variations in fiber density, and which may be manufactured without using complicated processes and without losing of bamboo.

The object of a second invention of the present application is to develop a pressure-formed bamboo product composed of high-strength bamboo materials which are uniformly strong therethroughout with a reduced fiber density variation, and which may be manufactured without using any complicated process and without wasting of bamboo.

The object of a third invention of the present application is to provide a process for producing pressure-formed bamboo products while reducing waste, increasing the production efficiency for bamboo in more simple manner, decreasing bamboo fiber density irregularities, and effectively exterminating eggs of harmful insects from the bamboo.

BRIEF SUMMARY OF THE INVENTION

The first invention of the present application provides a pressure-formed bamboo product composed of bamboo material comprising a plurality of extrafine bamboo slivers. The bamboo slivers are obtained by separating under pressure long bamboo divisional pieces in directions intersecting the longitudinal direction of the fibers while maintaining the longitudinal continuity of the fibers and a resin, wherein extrafine bamboo slivers are joined together with the resin through pressure forming to take the form of a plate or bar.

The second invention of the present application provides a pressure-formed bamboo product in accordance with the first invention of the present application which is composed of a plurality of bamboo pieces laminated to each other in such a manner that the bamboo fibers of each piece may extend respectively in different directions.

The third invention of the present application provides a process for producing a pressure formed product of bamboo as characterized in that it comprises steps of splitting a bamboo radially into long bamboo divisional pieces, subjecting the bamboo divisional pieces to heat mothproofing, pressing the heat-mothproofed bamboo divisional pieces into a plurality of extrafine bamboo slivers, applying resin to said plurality of extrafine bamboo slivers, and pressing the resin-applied extrafine bamboo slivers into a proper form.

In the present invention, unlike a conventional method wherein long bamboo square bars of a predetermined size are produced so as to laminate them one to another, a bamboo is split in the radial direction into long bamboo divisional pieces, which are, then, separated under pressure into a plurality of extrafine bamboo slivers, which are, then, pressed into a form. Therefore, this avoids the necessity of cutting in sizes. More specifically, in order to obtain bamboo divisional pieces, an unprocessed bamboo is only split in a direction along which the bamboo fibers run, so that no measurement whatsoever is necessary, efficient processing is possible, and no waste occurs incidental to gathering of usable bamboo portions. Also, in a process for separating the bamboo divisional pieces into a plurality of extrafine bamboo slivers, the bamboo divisional pieces are only passed through the pressing rollers without any measurement step, so simple, excellent, and efficient processing is possible and no waste occurs incidental to gathering of usable bamboo portions. The separation into a plurality of extrafine bamboo slivers is followed by a pressure forming process, whereby the fibers of bamboo constituting the entire resultant formed goods will be substantially uniform in density. Eggs of insects harmful to bamboo which may have been laid within the bamboo are killed by the heat mothproofing prior to the pressing process to prevent any damage from incubated insects. In particular, since this specific heat mothproofing constitutes the application of heat to the goods to be processed, the bamboo itself may become flexible because of the heat, and therefore, said pressing process can facilitate separation of the bamboo into extrafine bamboo slivers to ensure that the efficiency of pressing process will be much more improved.

DETAILED DESCRIPTION OF THE PREFERRED EMBODIMENT

An embodiment of the present invention will be described with reference to the accompanying drawings.

Figure 1:
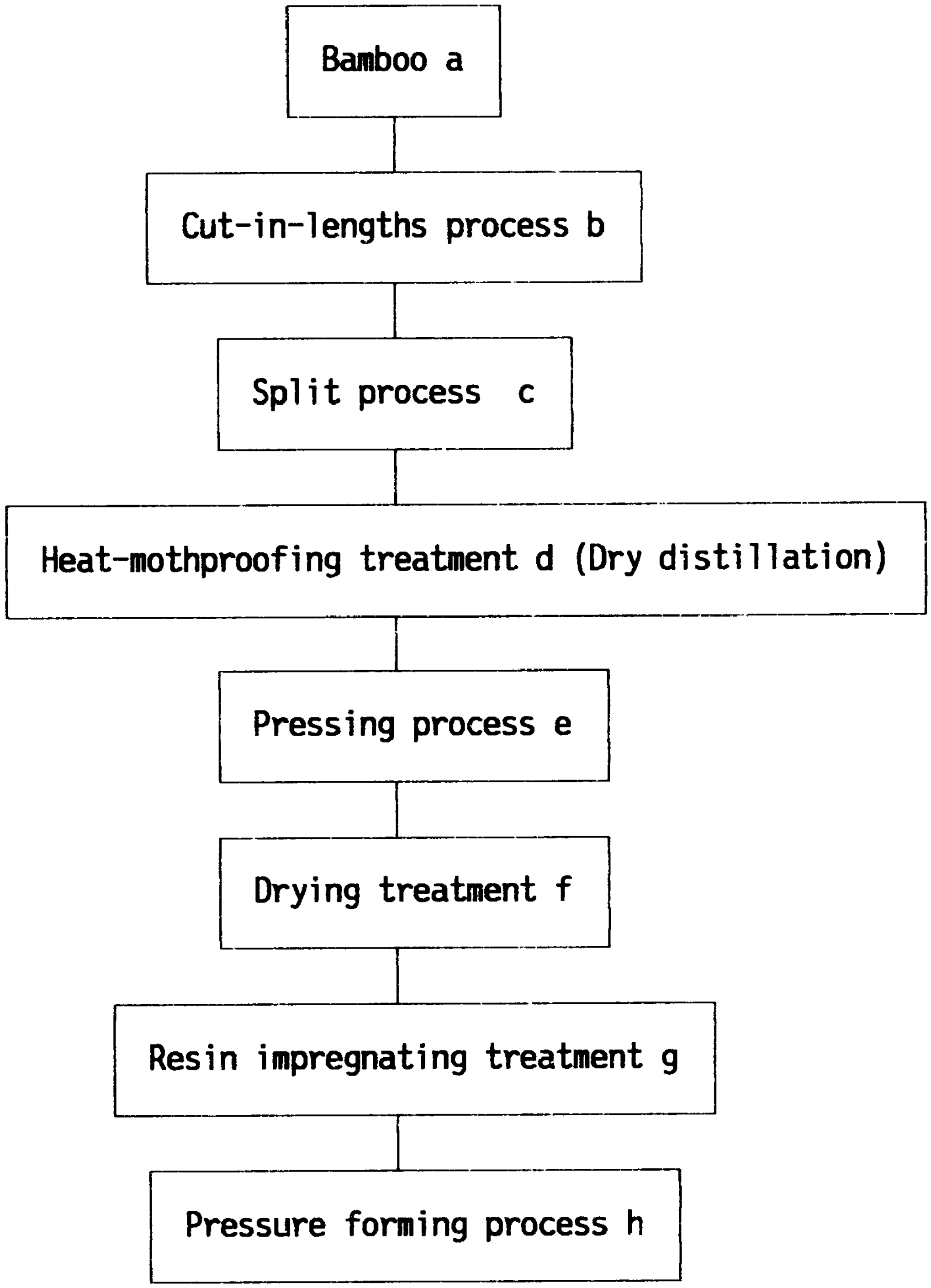
FIG. 1 is a flow chart of production procedure steps in accordance with an embodiment of the present invention.

FIG. 1 is a flow chart of the production procedure steps of one embodiment of the present invention. FIGS. 2(A)–2(F) are views illustrating the processing of a bamboo according to the production procedure steps of FIG. 1. A pressure-formed bamboo product and a production process therefor will be described with reference to these figures of drawing.

Figure 2:
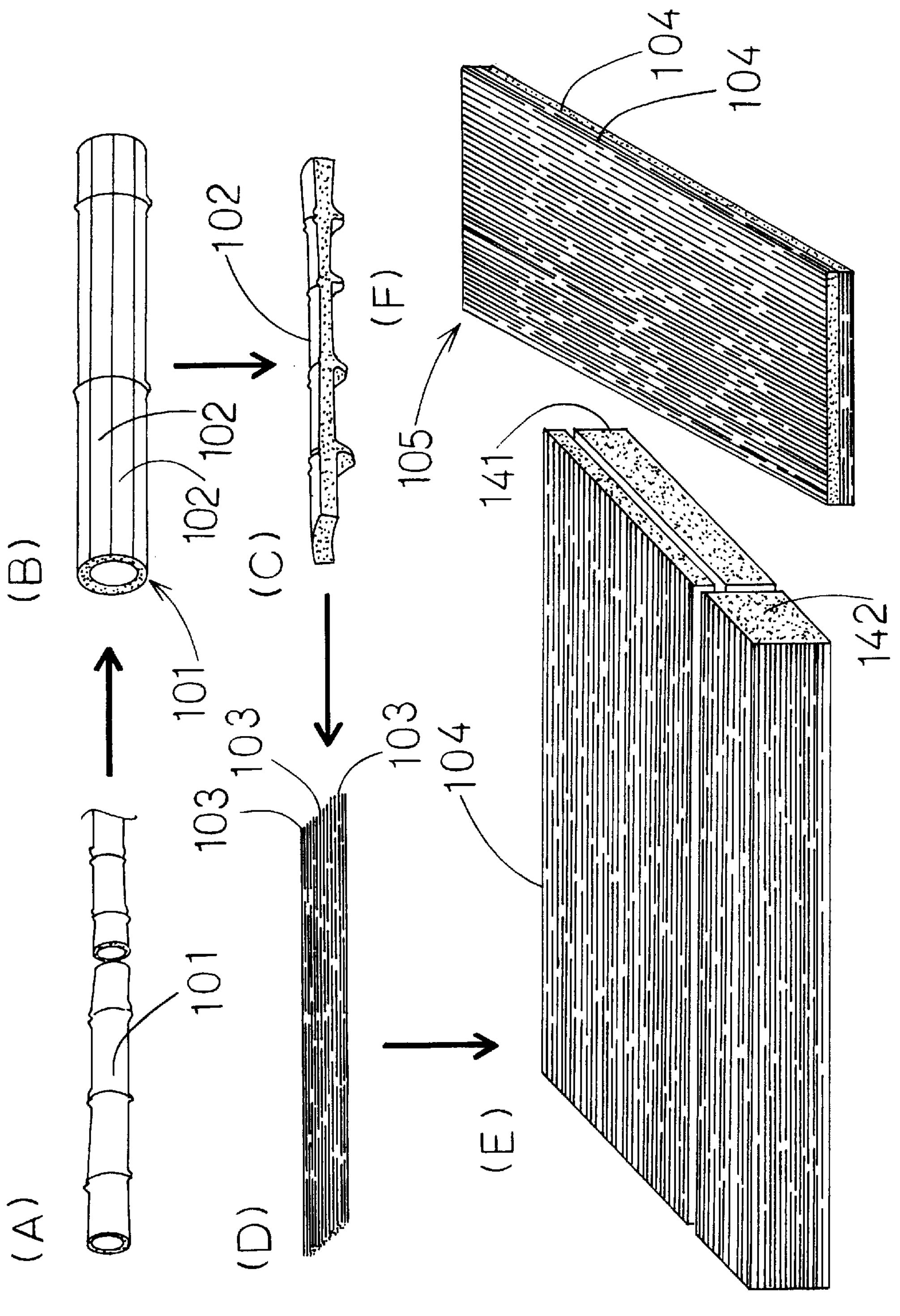
FIGS. 2(A)–2(F) explaining the processing details for bamboo in said steps.

A cut-in-lengths process b, as shown in FIG. 2(A), a bamboo 101 is cut in a proper length by a cutter such as a saw. Any bamboo such as a thick-stemmed bamboo (*phyllostachys pubescent*), a black bamboo (*phyllostachys nigra*), common Japanese bamboo (*phyllostachys bambusoides*), etc., may be adequately employed. Conventional methods required selection of bamboo having a diameter of a suitable size to reduce cutting loss, but such a requirement is not necessary according to the present invention. This specific cut-in-lengths process b is so intended as to make convenient processings in the subsequent steps or transportation of works between the steps. This step, therefore, may be omitted. A bamboo with or without skin thereon may be used. The bamboo skin may be removed in any of the subsequent steps.

Split process c.

As shown in FIGS. 2(B) and 2(C), the bamboo 101 is split radially into a suitable number of long bamboo divisional pieces 102. This operation may be conducted by a cutter such as a saw or hatchet.

Heat-mothproofing treatment (dry distillation) d.

In this step, by subjecting a bamboo divisional piece 102 to dry distillation with heat and pressure, eggs of insects laid inside the bamboo are killed. This heat and pressure application also can helps decrease bonding strength between the bamboo fibers in directions intersecting the longitudinal direction. The dry distillation may be achieved by heating bamboo divisional pieces 102 with steam in a high steam pressure boiler. This steaming operation may be performed in the boiler under a pressure of 3 to 7 kg at a temperature of 110 to 190° C. for 20 to 180 minutes.

In the alternative, a boiling treatment is also effective wherein insect eggs killed by boiling bamboo divisional pieces 102 in the high pressure boiler. This treatment can also decrease the bonding strength between the bamboo fibers in directions intersecting the longitudinal direction. This boiling operation may be done using boiling water, but a temperature of 60 to 80° C. may sufficiently achieve the purpose. The boiling time should preferably be 2 to 10 hours.

In this heat-mothproofing treatment d, its inherent effect may be achieved either by said dry distillation only or through both the dry distillation and boiling treatments. In consideration of production efficiency, however, dry distillation alone is effective enough to increase efficiency. Particularly, since the dry distillation can be executed at a temperature of over 100° C. under a pressure higher than the atmospheric pressure to secure a good mothproofing effect, the dry distillation is preferable to the boiling treatment.

Pressing process e.

Figure 3:
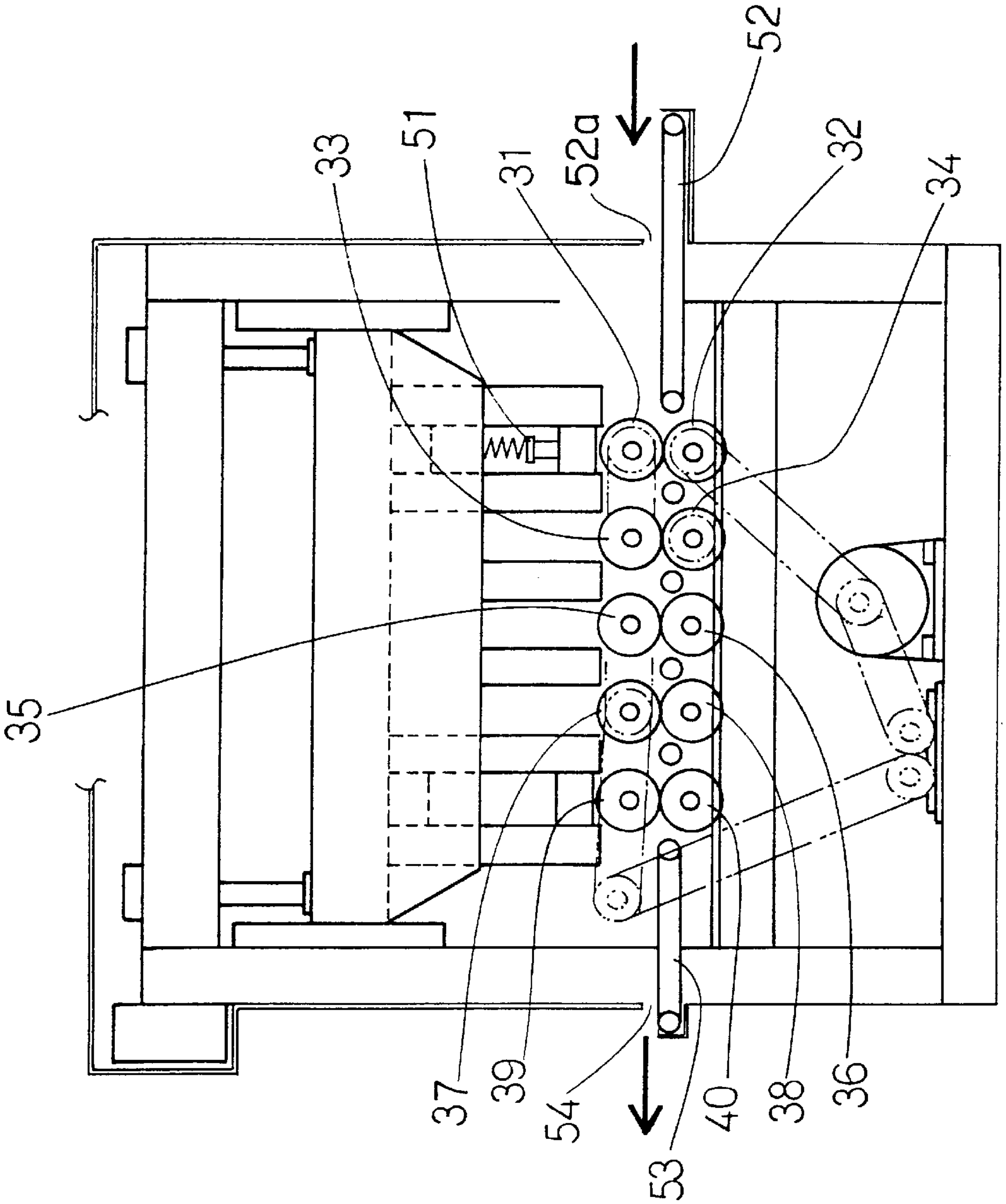
FIG. 3 is a view explaining an entire roller press for use in the pressing process.

Bamboo divisional pieces 102 which have undergone heat mothproofing may be pressed by a pressing machine so as to be broken into a plurality of extrafine bamboo slivers 103 (see FIG. 2(D)). This operation may be done by a roller press as shown by FIG. 3, but other known pressing machines may also be used. In short, all what has to be done is to split the bamboo divisional piece 102 with a pressure applied in directions intersecting the longitudinal direction of the bamboo divisional piece 102 by breaking the connections between the bamboo fibers in directions intersecting the longitudinal direction. This obtains extrafine bamboo slivers 103 which have been separated from each other in directions intersecting the longitudinal direction of the fibers while the longitudinal continuity of the fibers is maintained.

The extrafine bamboo sliver 103 is not uniform in its section in directions intersecting the longitudinal direction because of the pressing process, but 90% of all of the extrafine bamboo slivers obtained should preferably be of a size large enough to be received by a circle having a diameter of 0.1 to 10 mm. For a bamboo sliver of a size of under 0.1 mm, the continuity of longitudinal fibers is difficult to maintain. The continuity of longitudinal fibers, however, is not necessarily maintained completely over the entire length of the bamboo divisional piece 102, but over a length of the order of 10 cm. On the contrary, for diameters of over 10 mm, the bond strength between extrafine bamboo slivers 103 decreases in the forming operation as described later. This leads to reduction of strength of pressure formed plates or bars as a whole. The cross sectional size of the extrafine bamboo slivers 103 can be adjusted by controlling the heat mothproofing and the pressing process. For the purpose of processing, it is most preferable that 90% of all extrafine bamboo slivers 103 thus prepared be so large in cross section that each of them can fit into a circle whose diameter is 0.5 to 5 mm.

Now, the roller press as intended for the bamboo products of the present invention will be briefly described with reference to FIGS. 3 and 4. FIG. 3 is a view explanatory of the entire roller press, and FIG. 4 an enlarged view of the important part of said device.

This specific roller press comprises upper and lower pairs of rollers (31,32), (33,34), (35,36), (37,38), and (39,40), each pair being arranged one after the other. The upper rollers can be moved up and down all together or individually. Each of the upper rollers is always biased downward by a coil spring 41. The bamboo divisional pieces 102 are fed through these upper and lower rollers so that they are pressed into extrafine bamboo slivers 103.

The bamboo divisional pieces 102 are transferred by a conveyor 52 as shown on the right side of the rollers in FIG. 3 from an inlet 52*a* to the interior of the machine. Then, the bamboo divisional pieces 102 are introduced through the five upper and lower pairs of rollers, then pressed so that the bonding between the bamboo fibers of the bamboo divisional pieces 102 in directions intersecting the longitudinal direction are broken to form extrafine bamboo slivers 103.

The resultant extrafine bamboo slivers 103 are passed from a conveyor 53 through an outlet 54 to the outside.

Figure 4:
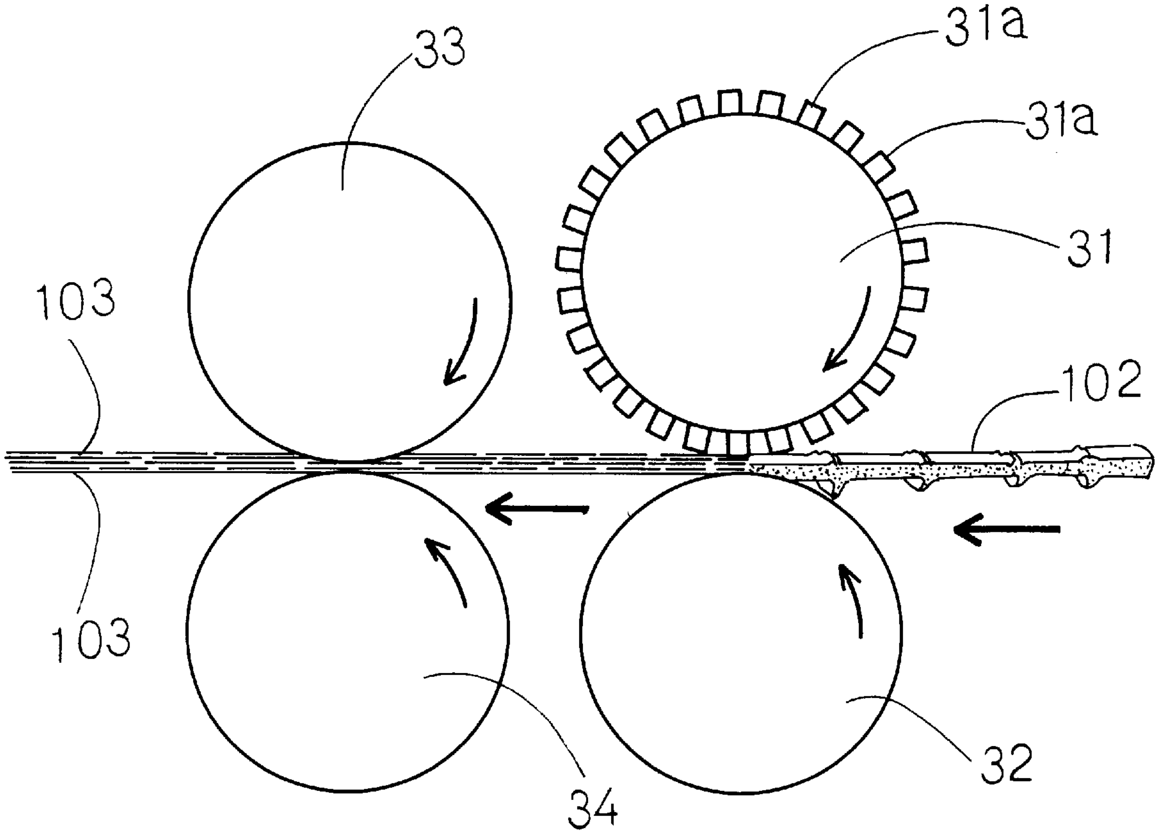
FIG. 4 is a view explaining an important part of the roller press of FIG. 3.

As illustrated in FIG. 4, only the upper front roller 31 has a plurality of ribs 31*a* formed on the outer periphery thereof and extending in an axial direction in order to take the bamboo divisional pieces 102 in very easily, while the other rollers do not need such ribs. However lower rollers 32, 34, and so forth may be provided with narrow grooves extending in a peripheral direction to conveniently facilitate dripping through the grooves of liquids oozing out from the bamboo.

In addition, this pressing process may be followed by fungusproofing or mothproofing.

Characteristically, the bamboo contains fungusproof and mothproof properties, but to improve such properties, extrafine bamboo slivers 103 may also be subjected to fungusproofing and mothproofing. Such treatments can be achieved by immersing extrafine bamboo slivers 103 in fungusproofing and mothproofing agents, or spraying said agents onto the extrafine bamboo slivers 103. However, such treatments may be conducted as needed, or omitted, or practiced in any other procedure step.

Drying treatment f.

This process is intended for removing moisture from the bamboo and its periphery. In particular, if said fungusproofing and mothproofing have been made, moisture from the fungusproofing and mothproofing agents must be removed. This process, however, may be done as needed, or omitted, or practiced in any other procedure step.

Resin impregnating treatment g.

Prior to pressure forming, extrafine bamboo slivers 103 are impregnated with resin as a binder. The resin acts as a glue curing agent for the extrafine bamboo slivers 103; thermal curing resin such as phenolic resin, urea resin, unsaturated polyester resin, epoxy resin, etc., is of a proper type, but thermoplastic resin may be useful. This specific process is carried out by immersing extrafine bamboo slivers 103 with resin, or spraying resin onto the extrafine bamboo slivers 103.

The resultant bamboo plates have improved strength and water resistance as well.

Pigment may be administered concurrently with the application of the resin.

Pressure forming process h.

Figure 5:
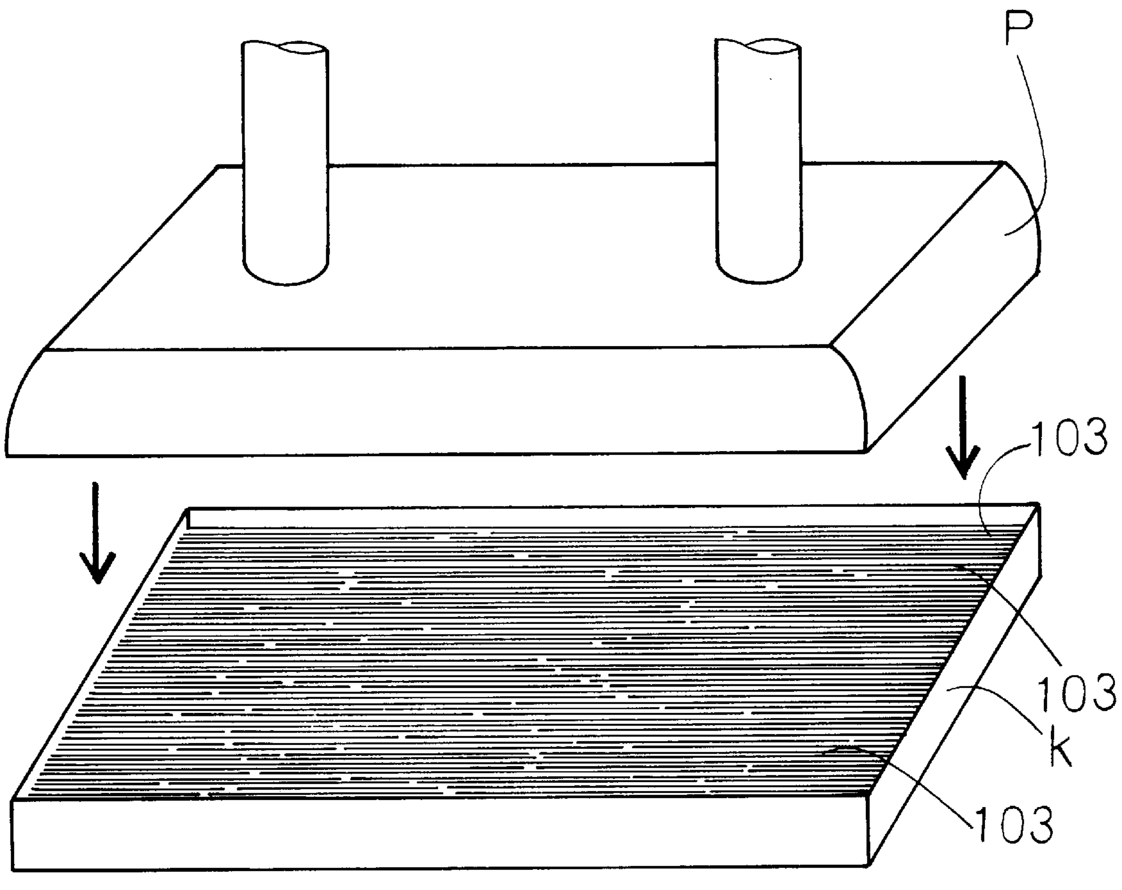
FIG. 5 is a perspective view of a forming system for use in the pressure forming process in accordance with the present invention.

The extrafine bamboo slivers 103 impregnated with resin is molded by pressure forming machine into a bamboo sheet 104 (see FIG. 2(E)). A known conventional machine for forming resin or plywood is usable. FIG. 5 specifically shows such an example apparatus wherein extrafine bamboo slivers 103 are introduced into a chase k and pressurized by means of a press head p. A bamboo sheet 104 thus obtained is composed of a plurality of extrafine bamboo slivers 103 firmly joined together by resin, said extrafine bamboo slivers 103 being a product which resulted from splitting a bamboo divisional piece 102 under pressure in directions intersecting the longitudinal direction of the bamboo fibers while retaining the longitudinal continuity of the bamboo fibers. This specific bamboo plate material 104 has a strength equal to or higher than that of conventional bamboo plate material. In particular, the bamboo fibers are impregnated with resin so that extrafine bamboo slivers 103 are firmly joined together. Furthermore, an addition of the strength of the ingrained resin to the longitudinal strength of bamboo fibers may cause a very great strength to the bamboo fibers acting in its longitudinal direction.

In FIG. 5, extrafine bamboo slivers 103 are all arranged longitudinally within the chase k, and so it follows from this fact that the resulted bamboo sheet 104 has also its extrafine bamboo slivers 103 being arranged to extend in the same direction. However, extrafine bamboo slivers 103 may be placed in the chase to run in different directions respectively so that a bamboo plate material constituted by the extrafine bamboo slivers 10 arranged in a disorderly fashion will result from the pressing operation. Such a bamboo plate material formed with disorderly arranged bamboo fibers has good soundproof and heat insulating properties.

Additionally, a weighing step may be performed before or during the pressure forming step. This weighing step makes it possible to form bamboo plates materials having a uniform thickness or density.

For example, extrafine bamboo slivers 103 are introduced into a mixer, and agitated together with resin as a binder, and then, they are weighed with a scale before proceeding to the pressure forming step. In that case, a product thus obtained is formed with disorderly arranged bamboo fibers.

Alternatively, a process according to the present invention may be provided wherein extrafine bamboo slivers and resin used can be weighed during the pressure forming operation.

It goes without saying that prior to the mixing operation, extrafine bamboo slivers 103 may be properly cut in a short length.

The shape or size of bamboo sheet 104 may be properly changed by the use of different chases; FIG. 2(E) illustrates other types of bamboo products such as a thicker bamboo plate 141 and a bar-formed (columnar) article 142. After a bamboo sheet 104 has been formed, it may be cut in a proper thickness or into a bar (column). Pressure-formed bamboo plates or bars thus obtained may be utilized as building materials for wall or column construction, or for other various applications.

Furthermore, another plate material may be laminated to a completed bamboo plate material 104 on the front or back side. The other plate material may include wood, synthetic resin, paper, and a plate material made of bamboo as shown in a prior art example (a bamboo laminated sheet 5 cut in a proper size). Said bamboo plate as shown in the prior art example takes on the surface a beauty inherent in bamboo. So, there will be obtained a bamboo plate with a beauty peculiar to bamboo as well as an improved strength and productivity if such a plate is adhered to the surface of the bamboo sheet 104. When the surface beauty is to be expressed by said prior art bamboo sheet, a comparatively thin bamboo laminated sheet 5 having a cross sectional thickness of the order to 0.2 to 10 mm will do. Such a pressure-formed product having a surface gifted with the beauty peculiar to bamboo may be used as a building material for wall or column construction to add more decorative effect to completed walls or columns.

As illustrated in FIG. 2(F), a ply bamboo sheet 105 may be manufactured by laminating a plurality of bamboo sheets 104 one to another, more specifically, by joining them under a proper pressure with an adhesive interposed between the front face of one bamboo sheet 104 and the back face of the other bamboo sheet 104. A conventional plying machine for wood can be used in this operation. In that case, each bamboo sheet 104 composed of extrafine bamboo slivers 103 running in the same direction (viz. in a direction in which all of the fibers extend) must be used, and in the adjacent bamboo plates, the respective extrafine bamboo slivers 103 are arranged to look toward different directions. That is, the both bamboo sheets 104, which are each strong longitudinally of the fibers thereof, are stuck to each other with one bamboo sheet being placed longitudinally and the other one laterally to the one bamboo sheet as shown in the drawing (in the drawing is shown two-ply sheet with the respective fibers crossing each other. In the case of three- or more numeral-ply bamboo sheets, the fibers of each pair of adjacent sheets are also arranged to intersect to each other at right angles) to ensure that the bamboo laminated sheet 105 will be uniformly strong in either direction. Therefore, this product may be utilized for a building material, and other applications, and in particular, it may be also used as a concrete panel which is a crucial problem of the drain upon forest resources.

By arranging the extrafine bamboo slivers 103 so as to form a two-, three-, or more numeral-ply article when the bamboo slivers 103 are introduced into the pressure forming chase as described above, a bamboo laminated sheet 105 may be manufactured by one cycle of the forming operation.

The pressure formed bamboo plate or bar obtained by the above-described process addresses various problems of conventional bamboo plates, while retaining the properties inherently possessed by the bamboo (germproof properties, fungusproof properties, easy incineration, prevention of drain upon forest resources by the use of bamboo which is short in the growing cycle). The bamboo slivers of the present invention may be made in other forms than bar or plates with different shapes of forming chases.

Figure 6:
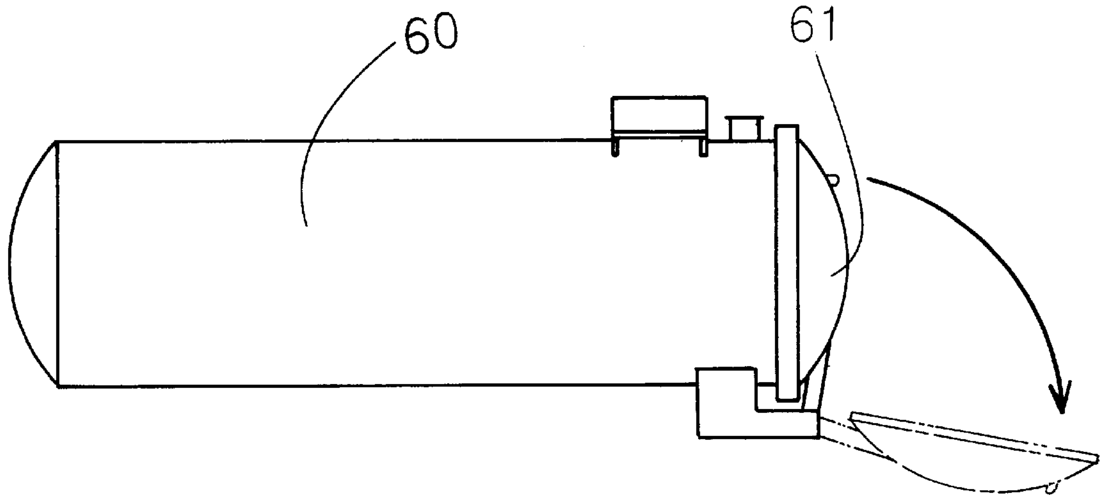
FIG. 6 is a plan view of a high pressure boiler for use in the heat mothproofing of the present invention.

FIG. 6 is a plan view explanatory of a high steam pressure boiler for carrying out the heat treatment d for mothproofing, i.e.,dry distillation.

As already described, the high pressure boiler 60 is used to heat with steam and pressure a plurality of bamboo divisional pieces 102 to remove eggs of harmful insects from the bamboo and at the same time, to soften the bamboo divisional pieces 102. This is a step or a preliminary process before the next pressing step e.

The high pressure boiler 60 is a large-sized pressurizing boiler which is, for example, about 4.5 meters in height, and about 1.5 meters in diameter, equipped with a door 61 provided in one end thereof and is spacious enough to accommodate a carriage loaded with bamboo divisional pieces 102.

Figure 7:
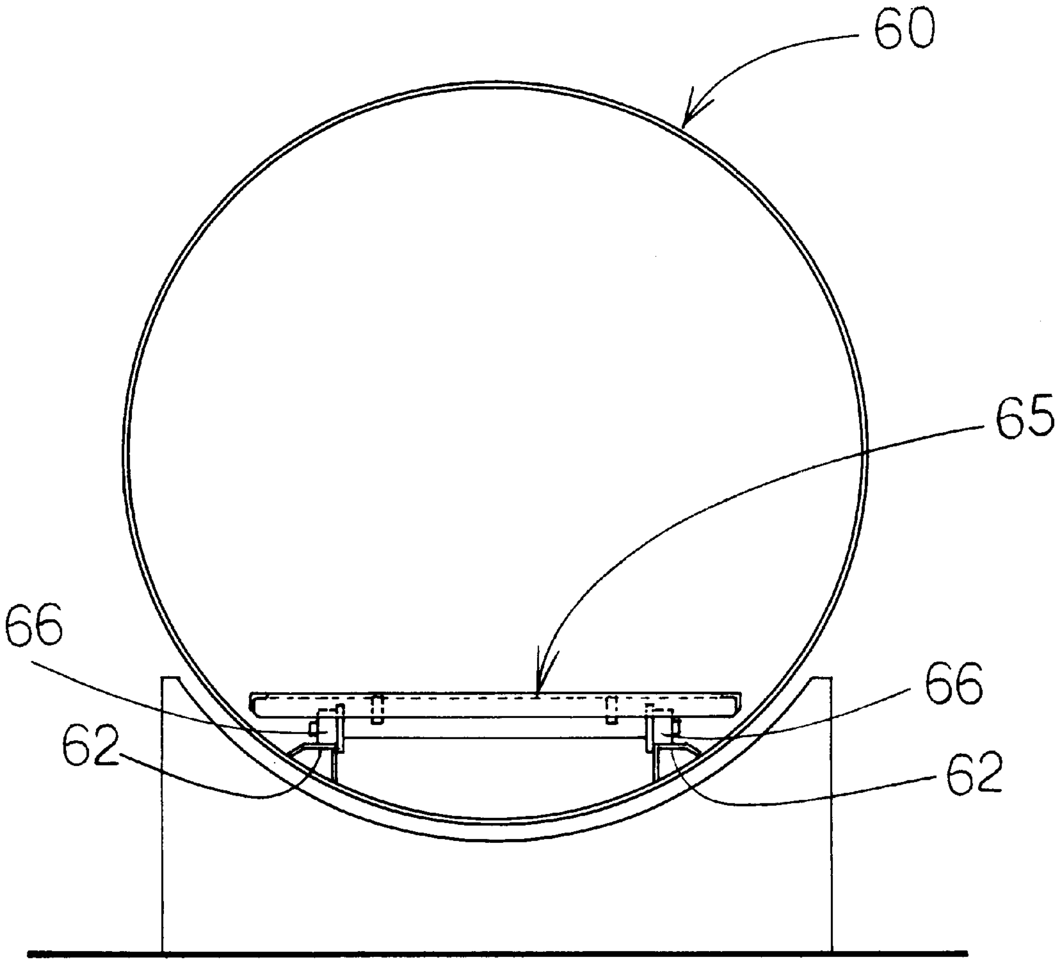
FIG. 7 is a view explaining the high pressure boiler of FIG. 6 viewed from its door's side.

FIG. 7 is a view explanatory of the high pressure boiler 60 observed from the door side, wherein two parallel rails 62,62 are laid in the lower portion of the interior of the boiler to run longitudinally of the boiler. This drawing illustrates wheels 66 of a carriage 65 placed on the rails 62,62 within the high pressure boiler 60, but bamboo divisional pieces 102 to be loaded on the carriage 65 are not shown in the drawing.

Figure 8A:
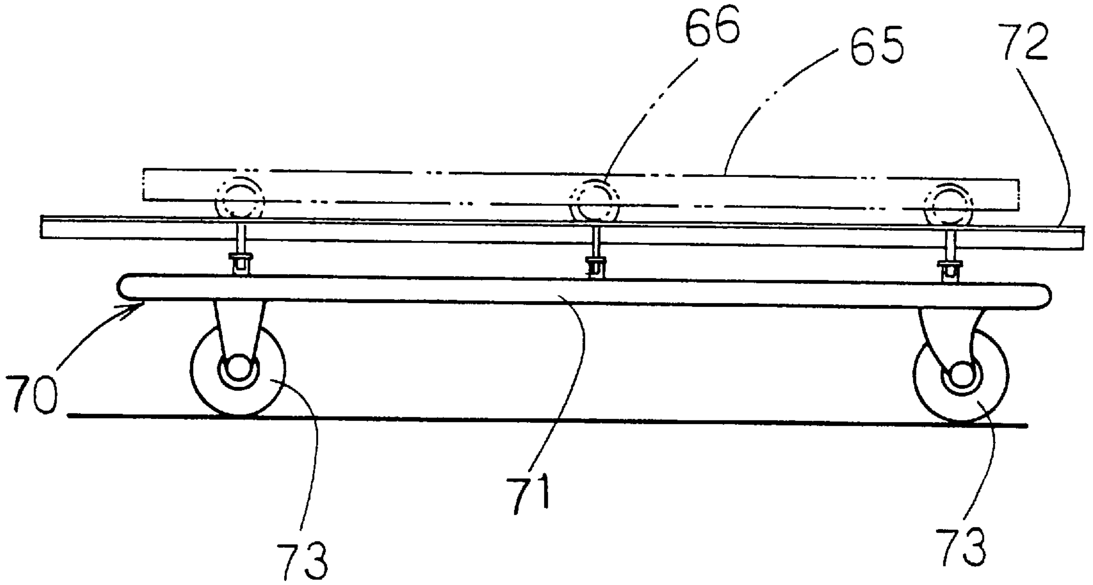
FIGS. 8(A)–8(B) shows a conveying carriage for conveying a carriage into the high pressure boiler, FIG. 8(A) being a side view, and FIG. 8(B) a plan view.
Figure 8B:
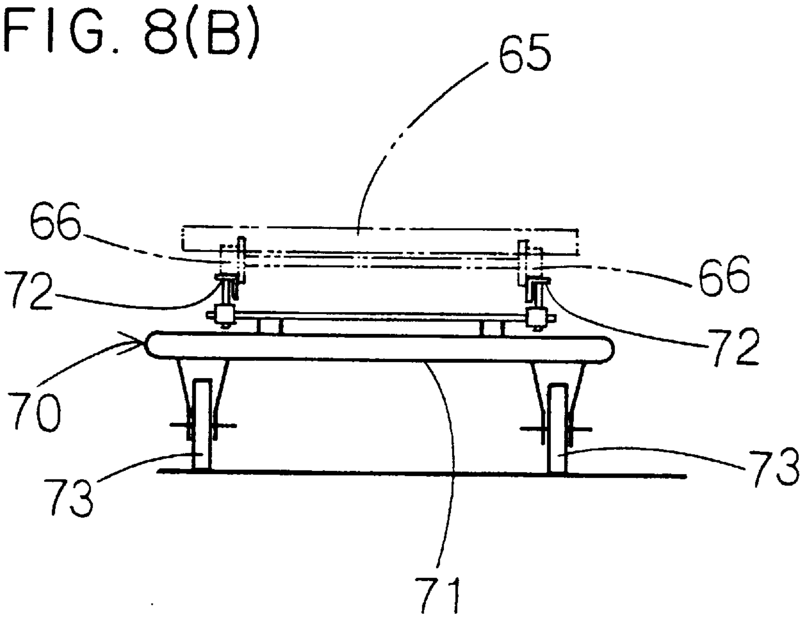
Figures 9A, 9B, 9C, 9D, 9E, 9F:
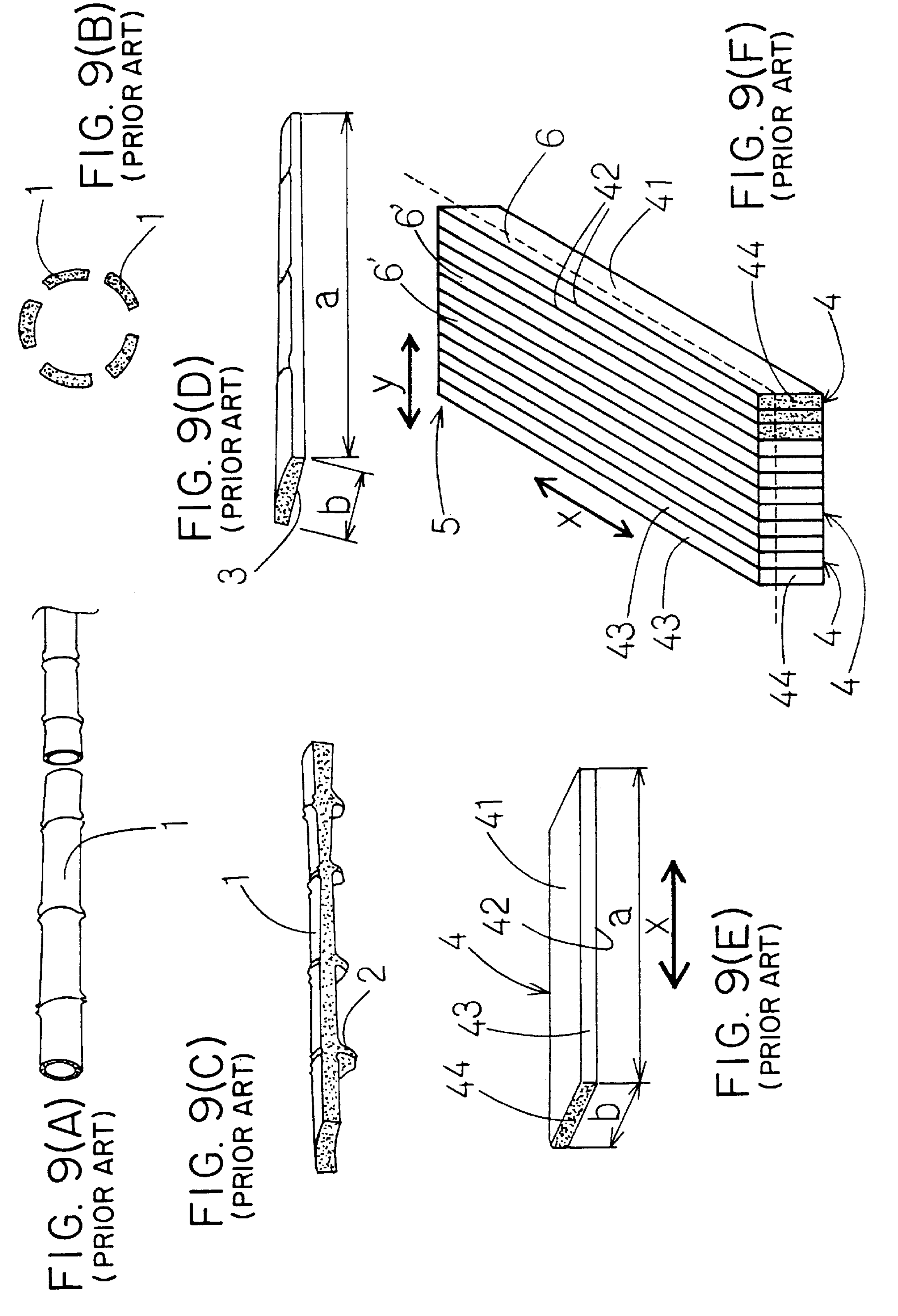
FIG. 9(A) (PRIOR ART)
FIG. 9(B) (PRIOR ART)
FIG. 9(C) (PRIOR ART)
FIG. 9(D) (PRIOR ART)
FIG. 9(E) (PRIOR ART)
FIG. 9(F) (PRIOR ART)
FIGS. 9(A)–9(F) are view explaining prior art production procedure steps.

FIGS. 8(A) and 8(B) show a conveying carriage 70 for conveying the carriage 65 in the high pressure boiler 60, FIG. 8(A) being a side view, and FIG. 8(B) a front view.

The conveying carriage 70 has two parallel rails 72,73 fixedly secured to the upper side of a body 71, and two pairs of wheels 73,73 mounted to the lower side of the body 71. The rails 72,72 are identical to the rails 62,62 provided within said high pressure boiler 60 in height and interval therebetween. The wheels 66 of said carriage 65 are adapted to be placed on the rails 72,72 of the conveying carriage 70.

The conveying carriage 70 loaded with the carriage 65 is moved to the opening of the door 61 in the high pressure boiler 60 until the rails 72,72 of the conveying carriage 70 are connected with the rails 62,62 provided inside the high pressure boiler 60 so that the carriage 65 on the conveying carriage 70 may be simply introduced into the high pressure boiler 60. Thus, the bamboo divisional pieces 102 on board the carriage 65 can be easily carried into the high pressure boiler 60. After the carriage 65 has enters into the high pressure boiler 60, the door 61 is closed, and then the dry distillation starts.

To be brief, in the first invention of the present application, there is provided a pressure-formed bamboo product composed of bamboo materials which have a reduced variation in fiber density which may be manufactured without recourse to any complicated process and without loss or waste of bamboo.

In the second invention of the present application, there is provided a pressure-formed bamboo product composed of bamboo materials which are strongly strong therethroughout with a reduced variation in fiber, which may be manufactured without recourse to any complicated process and without loss or waste of bamboo.

In the third invention of the present application, there is provided a process for manufacturing a pressure-formed bamboo product composed of bamboo materials which have a reduced variation in fiber density, wherein any harm caused by eggs of insects laid in the bamboo can be prevented, bamboo materials can be used effectively, and the production efficiency can be increased.

What is claimed is:

1. A method of shaping bamboo fibers, comprising the steps of:

splitting bamboo rods along an axial direction thereof to obtain a plurality of divisional bamboo pieces;

heat treating the divisional bamboo pieces in a manner sufficient to exterminate insect eggs in the divisional bamboo pieces;

applying mechanical pressure to the divisional bamboo pieces in a direction transverse to an axial direction of the divisional bamboo pieces to obtain a plurality of bamboo slivers;

applying an adhesive to the plurality of bamboo slivers; and shaping the plurality of bamboo slivers having the adhesive applied thereto in a form.

2. The method according to claim 1, wherein said step of shaping comprises arranging the plurality of bamboo slivers substantially parallel in the form.

3. The method according to claim 1, wherein said step of shaping comprises arranging some of the plurality of bamboo slivers transverse to others of the plurality of bamboo slivers.

4. The method according to claim 1, wherein said step of applying an adhesive comprises applying one of a thermosetting resin and a thermoplastic resin.

5. The method according to claim 4, wherein said step of applying an adhesive comprises applying one of a thermosetting resin selected from the group consisting of phenolic resin, urea resin, unsaturated polyester resin, and epoxy resin.

6. The method according to claim 1, wherein said shaping step comprises shaping the plurality of bamboo slivers into one of a board and a beam.

7. The method according to claim 1, wherein said step of heat treating the divisional bamboo pieces comprises at least one of a dry distillation treatment and a hot water treatment.

8. The method according to claim 7, wherein said dry distillation treatment comprises applying high pressure steam to the divisional bamboo pieces.

9. The method according to claim 8, wherein said dry distillation treatment comprises applying steam at a temperature of 110° C. to 190° C. at a pressure higher than atmospheric pressure for between 20–180 minutes.

10. The method according to claim 7, wherein said boiling treatment comprises immersing the divisional bamboo pieces in hot water for between 2 and 10 hours.

11. The method according to claim 10, wherein said boiling treatment comprises immersing the divisional bamboo pieces in hot water at a temperature between 60° C. to 100° C.

12. The method according to claim 1, wherein said plurality of bamboo slivers are between 0.1 mm and 10 mm.

13. The method according to claim 1, wherein said plurality of bamboo slivers are between 0.5 mm and 5 mm.

14. A bamboo product made by the process of:

splitting bamboo rods along an axial direction thereof to obtain a plurality of divisional bamboo pieces;

heat treating the divisional bamboo pieces in a manner sufficient to exterminate insect eggs in the divisional bamboo pieces;

applying mechanical pressure to the divisional bamboo pieces in a direction transverse to an axial direction of the divisional bamboo pieces to obtain a plurality of bamboo slivers;

applying an adhesive to the plurality of bamboo slivers; and shaping the plurality of bamboo slivers having the adhesive applied thereto in a form.

15. A bamboo product comprising a plurality of bamboo slivers bonded together by an adhesive, wherein said bamboo slivers are heat-treated bamboo slivers substantially devoid of insect eggs.

* * * * *